(12) United States Patent
Onuma et al.

(10) Patent No.: US 6,580,514 B1
(45) Date of Patent: Jun. 17, 2003

(54) NON-CONTACT SILICON MELT SURFACE EVALUATION METHOD AND SYSTEM

(75) Inventors: Kazuo Onuma, Ibaraki (JP); Shin Nakamura, Tokyo (JP); Taketoshi Hibiya, Tokyo (JP)

(73) Assignees: NEC Corporation, Tokyo (JP); Agency of Industrial Science and Technology, Tokyo (JP)

( * ) Notice: Subject to any disclaimer, the term of this patent is extended or adjusted under 35 U.S.C. 154(b) by 0 days.

(21) Appl. No.: 09/559,063

(22) Filed: Apr. 28, 2000

(30) Foreign Application Priority Data

| Apr. 28, 1999 | (JP) | ............................................ 11-121321 |
| Apr. 28, 1999 | (JP) | ............................................ 11-121414 |
| Apr. 28, 1999 | (JP) | ............................................ 11-121426 |

(51) Int. Cl.⁷ .................................................. G01B 9/02
(52) U.S. Cl. ........................................ 356/512; 356/495
(58) Field of Search ................................ 356/35.5, 450, 356/484, 489, 491, 495, 512, 513, 514

(56) References Cited

U.S. PATENT DOCUMENTS

| 3,816,649 A | * | 6/1974 | Butters et al. ............... 356/512 |
| 4,340,306 A | * | 7/1982 | Balasubramanian ........ 356/513 |
| 4,764,680 A | * | 8/1988 | Geary .......................... 356/513 |
| 4,917,498 A | * | 4/1990 | Geary .......................... 356/513 |
| 5,210,591 A | * | 5/1993 | DeGroot ...................... 356/513 |
| 5,561,525 A | * | 10/1996 | Toyonaga et al. ........... 356/512 |

* cited by examiner

*Primary Examiner*—Samuel A. Turner
(74) *Attorney, Agent, or Firm*—McGinn & Gibb, PLLC

(57) ABSTRACT

An evaluation light 100 from a light source 1 is split to obtain a divided evaluation signal 120 and a reference signal 110, the divided evaluation signal 120 and the reference signal 110 being shone, respectively, onto a sample surface 32 and a reference surface 11 that is made of the same material as the sample, after which a reflected divided evaluation signal 121 and a reflected reference signal 111, which are reflected respectively on the sample surface 32 and the reference surface 11, are caused to interfere for analysis of the sample surface 32.

41 Claims, 2 Drawing Sheets

NON-CONTACT SILICON MELT SURFACE EVALUATION METHOD AND SYSTEM

BACKGROUND OF THE INVENTION

1. Field of the Invention

The present invention relates to a surface evaluation method and an associated surface evaluation system, and more particularly to light source technology for non-contact evaluation of a surface of a silicon melt (molten silicon) using optical phase-shift interferometry.

2. Background of the Invention

Phase-shift interferometry is proposed as a technology used to perform a non-contact evaluation of the condition of the surface of a sample. Phase-shift interferometry is described, for example, in Applied Physics Vol. 63, No. 7, page 713 (1994). In this technology, interference is caused between an evaluation signal reflected on the surface of the sample and a reference signal, and the sample surface is analyzed. Light generated from a He-Ne (helium-neon) laser light source is divided into an evaluation signal and a reference signal using a splitter, the evaluation signal being shone onto the sample surface and the reference signal being shone onto a reference surface, after which light is collected and interference caused. In the prior art, this technology was applied to the evaluation of samples such as crystal growth surfaces and molten surfaces, and the reference surface was generally a plane mirror.

The above-noted prior art, however, in the case in which the sample is non-planar, such as with a molten cylinder of silicon, did not provide sufficient technology or systems to perform evaluation of the surface of the molten fluid. That is, when using a reference surface with conditions that are different from those of the sample surface, unnecessary information are included in the interference signal, thereby making it difficult to evaluate the sample surface of interest.

In phase-shift interferometry in the prior art, unnecessary radiated wave and unnecessary reflected wave emanate from the surface of the sample, and when the frequency of the above-mentioned unnecessary radiated wave and the reflected wave are almost same as that of the evaluation signal, the evaluation signal is influenced by the unnecessary radiated wave and reflected wave, making it impossible to obtain a precise evaluation. In the case in which the sample is a silicon melt which is heated by a lamp using an image furnace in particular, the spectrum of radiated waves from the silicon melt and the spectrum of reflected waves of the lamp filament image from the silicon surface are approximately same with that of black-body radiation. For this reason, with a He-Ne laser of the prior art (633 nm), the influence of the above-mentioned radiation and reflection was too large to ignore.

Accordingly, it is an object of the present invention to provide a surface evaluation method and associated surface evaluation system that enable highly precise surface evaluation, without influence from a radiation signal from the sample.

SUMMARY OF THE INVENTION

According to the first embodiment of the present invention, a surface evaluation method in which evaluation signal from a light source is split to obtain a divided evaluation signal and a reference signal, the divided evaluation signal and the reference signal being shone, respectively, onto a sample surface and a reference surface, after which a reflected divided evaluation signal and a reflected reference signal, which are reflected respectively on the sample surface and the reference surface, are caused to interfere for analysis of the sample surface, and the reference surface is made of the same material as the sample.

According to the first embodiment of the present invention, the reference surface has the same curvature as the sample.

According to the first embodiment of the present invention, the sample surface has a shape of a side surface of a cylinder, and the reference surface a shape of a side surface of a cylinder.

According to the first embodiment of the present invention, the reference signal is reflected at a reference surface that is a polished mirror surface.

According to the second embodiment of the present invention, in a surface evaluation method for evaluating a sample surface having curvature, wherein an evaluation signal from a light source is divided so as to obtain a divided evaluation signal, the divided evaluation signal being shone onto the sample surface at a direction that is normal thereto.

The second embodiment of the present invention further provides a surface evaluation method, wherein an incidence onto a reference surface of a reference signal obtained by dividing an evaluation signal from a light source is in a normal direction with respect to the reference surface.

According to the third embodiment of the present invention, in a surface evaluation method in which evaluation light from a light source is split to obtain a divided evaluation signal and a reference signal, the divided evaluation signal and the reference signal being shone, respectively, onto a sample surface and a reference surface, after which a reflected divided evaluation signal and a reflected reference signal, which are reflected on the sample surface and the reference surface, respectively, are caused to interfere for analysis of the sample surface, wherein a frequency of the evaluation signal is selected such that a frequency of the reflected divided evaluation signal is different from that of a radiation signal emanated from the sample surface.

The third embodiment of the present invention also provides a surface evaluation method in which, after obtaining an interference signal by causing interference between the reflected divided evaluation signal and the reflected reference signal, a signal component having a wavelength that is longer than that of radiation signal is removed from the interference signal.

The third embodiment of the present invention also provides a surface evaluation method in which the wavelength of the evaluation signal is shorter than that of the radiation signal.

DESCRIPTION OF THE PREFERRED EMBODIMENTS

First Embodiment

Figure 1:
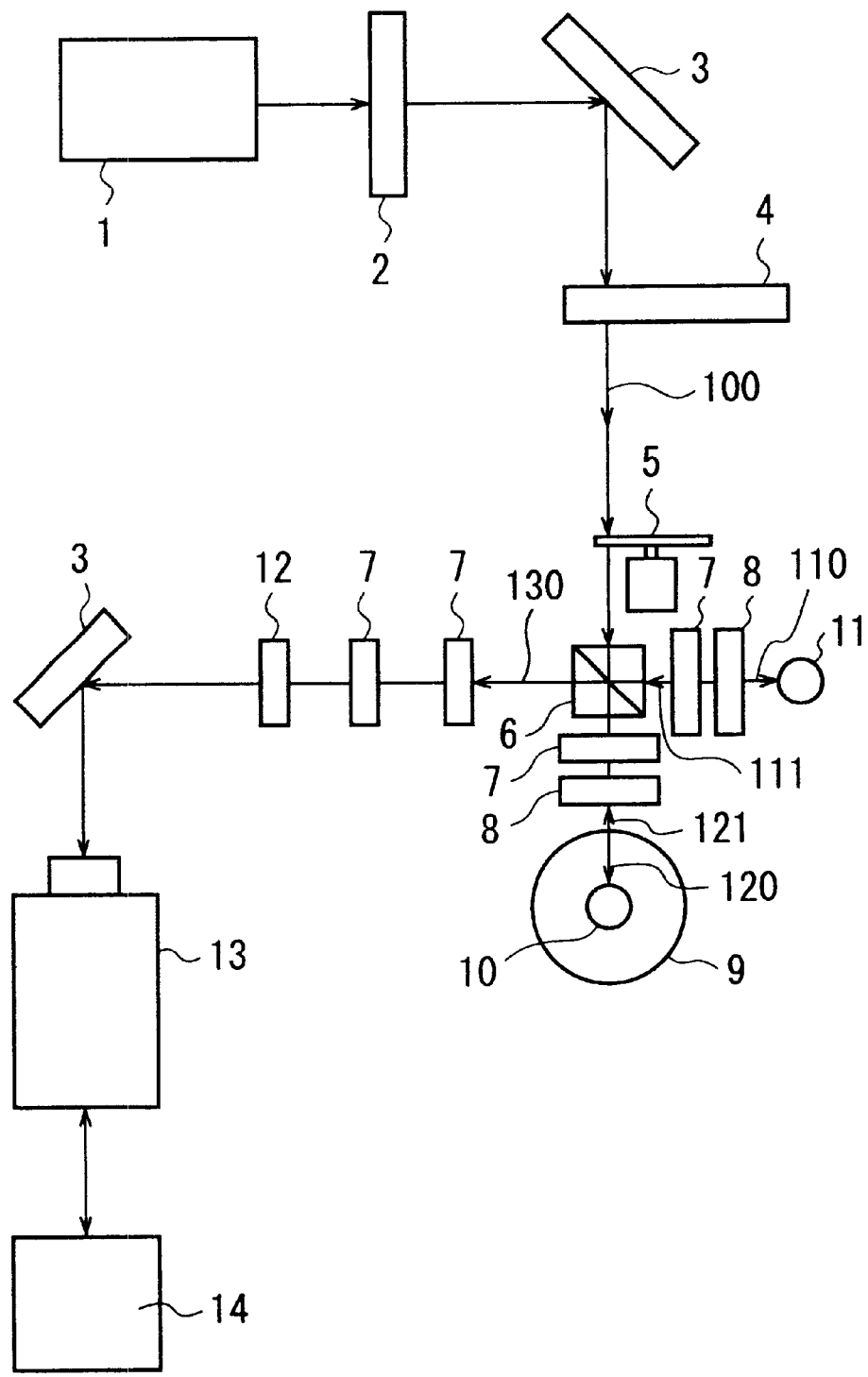
FIG. 1 is a block diagram of a surface evaluation system of the present invention.

The first embodiment of a surface evaluation method according to the present invention is described below. A feature of the first embodiment is the use of a reference surface having the same conditions as the sample surface, so that unnecessary information (background signal or the like) are removed from the interference signal that is output, thereby enabling highly precise evaluation of the surface of the sample.

The configuration of a surface evaluation system according to the present invention is described below, with reference to FIG. 1 and FIG. 2. This surface evaluation system has a light source 1 that generates an evaluation signal 100, a half-wave plate 2, a neutral density filter 4, a diffusion plate 5, a polarizing beam splitter 6, an image furnace 9, a silicon melt 10 which is a molten fluid disposed within the image furnace 9, a reference surface 11 that is formed by polishing a silicon crystal to the shape of a cylinder, a light-collecting lens 7, a quarter-wave plate 8, a filter 12, a video camera 13, and a computer 14 for analyzing data.

The laser light source 1 is a signal source that generates an evaluation signal 100 having linear polarization of a wavelength such that a wavelength of the reflected divided evaluation signal 121 reflected on the sample 10, that is, reflected on the silicon melt 10 is different from a wavelength of the unnecessary radiation signal from the sample surface 10. This would be, for example, a signal source 1 that generates an evaluation signal 100 of a wavelength that is shorter than the wavelengths of the unnecessary radiation signal (no shown in FIG. 1) from the sample 10 and the unnecessary reflection signal (no shown in FIG. 1) from the sample 10 surface. The half-wave plate 2 adjusts the polarization direction.

The polarizing beam splitter 6 has the function of splitting the laser light that is incident via the half-wave plate 2, the neutral density filter 4, and the diffusion plate 5, this being the evaluation signal 100. The evaluation signal 100 is split by the polarizing beam splitter 6 into a divided evaluation signal 120 and a reference signal 110. The divided evaluation signal 120 strikes the surface of the silicon melt 10, and the reference signal 110 strikes the reference surface 11.

After the divided evaluation signal 120 and the reference signal 110 are shone onto the silicon melt 10 surface and the reference surface 11, respectively, the quarter-wave plate 8 readjusts the polarization direction, so that the divided reflected evaluation signal 121 obtained from the sample surface 32 and the reflected reference signal 111 obtained from the reference surface 11 can interfere, and obtain the laser interference signal 130. The laser interference signal 130 from the quarter-wave plate 8 is collected by the light-collecting lens 7 and caused to strike the filter 12.

The filter 12 removes long-wavelength light radiated from the surface of the silicon melt 10 from the laser interference signal 130. The laser interference signal 130 having passed through the filter 12 is captured by the video camera 13, and then analyzed by the computer 14.

Example 1

In this example, surface vibration of silicon melt is measured without contact therewith, using phase-shift interferometry, that is high-resolution optical interferometry. The purpose of this measurement is to measure the vibration of the surface of the silicon melt 10 with high temporal and spatial resolution, and to examine how that vibration varies with a change in Marangoni number, and to predict the change of the shape of the silicon melt from the partial shape of the surface of the silicon melt.

An apparatus and a method for performing the above-noted measurement are described below. In this example, Michelson interferometry is used to convert Moire interference fringes to a high-resolution phase diagram. To prevent mixing of unnecessary radiation signal radiated from the silicon melt 10, the laser light source 1 used is an argon excimer laser with a wavelength of 488 nm. The light radiated from the image furnace 9 is cut by the filter 12. Because of the large curvature of the silicon melt 10, the contact range of the laser light is circle having a radius of approximately 0.5 mm. The spatial resolution of this apparatus is approximately 1 nm, and the temporal resolution is $\frac{1}{30}$ s.

The silicon melt 10 is a fluid column having a diameter of 10 mm and a height of approximately 10 mm, supported at the top and bottom by carbon, and heating by rotating elliptical image furnace 9 so as to melt. Under these conditions, the inside of the furnace is filled with argon gas, so that the silicon melt 10 does oxidize.

The temperature difference between the top and bottom surface is approximately 150K, and the upper surface temperature was increased. The Marangoni number is estimated to be approximately 14600. A solid silicon cylinder with a polished surface was used as the reference surface 11. Michelson interferometry was used, and the interference fringes obtained were converted to a 512-level phase diagram using an electronic Moire phase-shift method.

By using the above-noted optical arrangement, the interference signal that exhibits time variations due to the Marangoni vibration and characteristic vibrations at the surface of the silicon melt 10 were obtained as a two-dimensional plot. A computer 14 was used to multiply this by the generated fringe image so as to obtain a phase distribution plot having dimensions 0.5 mm×1.0 mm. By performing a Fourier transform on this, it was possible to obtain the vibration frequencies at the surface of the silicon melt 10.

In the above-noted embodiment, a necessary condition is the use of a cylindrical reference surface having a polished mirror surface with the same conditions as the sample surface. Although the first embodiment was described for the case of a silicon sample and the shape of the side surface of a cylinder, it will be understood that the present invention is not restricted in this manner with regard to material and shape.

According to the present invention, by using a reference surface having the same conditions as the sample surface, it is possible to perform sample surface evaluation with further improved precision, without the inclusion of unnecessary information in the interference signal.

According to the first embodiment of the present invention, a surface evaluation method in which evaluation light 100 from a light source 1 is split to obtain a divided evaluation signal 120 and a reference signal 110, the divided evaluation signal 120 and the reference signal 110 being shone, respectively, onto a sample surface 32 and a reference surface 11 that is made of the same material as the sample, after which a reflected divided evaluation signal 121 and a reflected reference signal 111, which are reflected respectively on the sample surface 32 and the reference surface 11, are caused to interfere for analysis of the sample surface.

According to the first embodiment of the present invention, the reference surface 11 has the same curvature 30 as the sample surface 32.

According to the first embodiment of the present invention, the sample surface 32 has a shape of a side surface of a cylinder, and the reference surface 11 has a shape of a side surface of a cylinder.

According to the first embodiment of the present invention, the reference signal is reflected at a reference surface that is a polished mirror surface.

The present invention further provides a surface evaluation method, wherein the sample surface is a surface of a molten fluid.

The present invention further provides a surface evaluation method, wherein the molten fluid surface is a silicon melt, and the reference surface is made of silicon.

The present invention further provides a surface evaluation system comprising a light source that is caused to generate an evaluation signal, an evaluation signal dividing means that divides the evaluation signal into a divided evaluation signal and a reference signal, and shines these signals onto a sample surface and a reference surface, respectively, and a laser interference means for causing interference between a reflected divided evaluation signal and a reflected reference signal reflected on the sample surface and the reference surface, respectively, wherein the reference surface is made of the same material as the sample.

The present invention further provides a surface evaluation system, wherein the reference surface has the same curvature as the sample surface.

The present invention further provides a surface evaluation system, wherein the reference surface is made of silicon.

The present invention further provides a surface evaluation system, wherein the reference surface has a shape of a side surface of a cylinder.

The present invention further provides a surface evaluation system, wherein the reference surface is a polished mirror surface.

Second Embodiment

The second embodiment of a surface evaluation method according to the present invention is described below, with reference made to the accompanying drawings. A feature of the present invention is that a measurement signal or reference signal is caused to shine onto the center of curvature of the sample surface from which they are to be reflected. Thus, because the reflected signal folds back on the path of incidence signal, it is possible to expand the reflection cross-sectional area under these conditions.

Next, a surface evaluation system of the second embodiment will be described, with reference being made to FIG. 1 and FIG. 2. This surface evaluation system has a laser light source 1 that generates an evaluation signal, a half-wave plate 2, a neutral density filter 4, a diffusion plate 5, a polarizing beam splitter 6, an image furnace 9, a silicon melt 10 which is a molten fluid disposed within the image furnace 9, a reference surface 11 that is a formed by a polishing a silicon crystal to the shape of a cylinder, a light-collecting lens 7, a quarter-wave plate 8, a filter 12, a video camera 13, and a computer 14 for analyzing data.

The laser light source 1 is a signal source that generates an evaluation signal 100 having linear polarization of a wavelength such that a wavelength of the reflected divided evaluation signal 121 reflected on the sample 10, that is, reflected on the silicon melt 10 is different from a wavelength of the unnecessary radiation signal from the sample surface 10. This would be, for example, a signal source that generates an evaluation signal of a wavelength that is shorter than the wavelengths of the radiation signal from the sample and the reflection signal from the sample surface. The half-wave plate 2 adjusts the polarization direction.

The polarizing beam splitter 6 has the function of splitting the laser light that is incident via the half-wave plate 2, the neutral density filter 4, and the diffusion plate 5, this being the evaluation signal. The evaluation signal is split by the polarizing beam splitter 6 into a divided evaluation signal and a reference signal. The divided evaluation signal strikes the surface of the silicon melt 10, and the reference signal strikes the reference surface 11.

After the divided evaluation signal 120 and the reference signal 110 are shone onto the silicon melt surface 32 and the reference surface 11, respectively, the quarter-wave plate 8 readjusts the polarization direction, so that the divided reflected evaluation signal 121 obtained from the sample surface 32 and the reflected reference signal 111 obtained from the reference surface 11 can interfere, and obtain the laser interference signal. The laser interference signal from the quarter-wave plate 8 is collected by the light-collecting lens 7 and caused to strike the filter 12.

The light-collecting lens 7 is structured so that the divided evaluation signal and the reference signal are focused on the center axis (symmetry axis) of the silicon melt 10 and the reference surface 11, respectively. That is, the light-collecting lens 7 has a shape that enables incidence from the normal directions with respect to the silicon melt surface 32 and the reference surface 11. This lens is, for example, the shape of the side of a cylinder.

The filter 12 removes long-wavelength light radiated from the surface of the silicon melt 10 from the laser interference signal 130. The laser interference signal having passed through the filter 12 is captured by the video camera 13, and then analyzed by the computer 14.

Example 2

In this example, surface vibration of silicon melt is measured without contact therewith, using phase-shift interferometry, that is high-resolution optical interferometry. The purpose of this measurement is to measure the vibration of the surface of the silicon melt with high temporal and spatial resolution, and to examine how that vibration varies with a change in Marangoni number, and to predict the change of the shape of the silicon melt from the partial shape of the surface of the silicon melt.

An apparatus and a method for performing the above-noted measurement are described below. In this example, Michelson interferometry is used to convert Moire interference fringes to a high-resolution phase diagram. To prevent mixing of light radiated from the silicon melt 10 (radiation signal), the laser light source 1 used is an argon excimer laser with a wavelength of 488 nm. The light radiated from the image furnace 9 is cut by the filter 12. Because of the large curvature of the silicon melt 10, the contact range of the laser light is circle having a radius of approximately 0.5 mm. The spatial resolution of this apparatus is approximately 1 nm, and the temporal resolution is 1/30 s.

The silicon melt 10 is a fluid column having a diameter of 10 mm and a height of approximately 10 mm, supported at the top and bottom by carbon, and heating by rotating elliptical image furnace 9 so as to melt. Under these conditions, the inside of the furnace is filled with argon gas, so that the silicon melt 10 does oxidize.

The temperature difference between the top and bottom surface is approximately 150K, and the upper surface temperature was increased. The Marangoni number is estimated to be approximately 14600. A solid silicon cylinder with a polished surface was used as the reference surface 11.

Michelson interferometry was used, and the interference fringes obtained were converted to a 512-level phase diagram using an electronic Moire phase-shift method.

By using the above-noted optical arrangement, the interference signal that exhibits time variations due to the Marangoni vibration and characteristic vibrations at the surface of the silicon melt 10 were obtained as a two-dimensional plot. A computer 14 was used to multiply this by the generated fringe image so as to obtain a phase distribution plot having dimensions 0.5 mm×1.0 mm. By performing a Fourier transform on this, it was possible to obtain the vibration frequencies at the surface of the silicon melt 10.

A necessary condition in the above-noted embodiment is that the light-collection lens 7 have a shape such that the laser light divided by the polarizing beam splitter 6 strikes the center axis (symmetry axis) of the cylindrical shaped silicon melt 10 and cylindrical silicon crystal used as the reference. It is also possible to adjust the position of the image furnace 9 that includes the silicon melt 10 and adjust the position of the cylindrical silicon crystal used as the reference so that the light can strike the sample surface 32 and reference surface 11 from the normal direction thereof. That is, by fixing the image furnace 9 and the reference cylindrical silicon crystal 21 in a three-dimensional movement apparatus (not shown in the drawing), the positions of the image furnace 9 and the reference cylindrical silicon crystal 21 are adjusted so that the divided laser light 120,110 can strike from the normal directions with respect to the sample surface 32 and the reference surface 11.

Although if the divided laser light is incident but skewed from the normal direction with respect to either the silicon melt 10 or the cylindrical silicon crystal 21 used as a reference, a phase distribution plot of 0.5×1.0 mm is obtained, the area usable for frequency analysis was only approximately 0.5×0.3 mm, which does not allow precise frequency analysis.

As described above, in a surface evaluation method for evaluating a sample surface having curvature, wherein an evaluation signal from a light source is divided so as to obtain a divided evaluation signal, the divided evaluation signal being shone onto the sample surface at a direction that is normal thereto.

The present invention also provides a surface evaluation method, wherein the sample surface has the shape of the side surface of a cylinder.

The present invention further provides a surface evaluation method, wherein the divided evaluation signal 120 is incident on a light path such that light is collected substantially on the center longitudinal-direction axis 10a of the cylindrical sample 10.

The present invention further provides a surface evaluation method wherein, the divided evaluation signal 120 passes through a light collector 7 having a focal point at the center 10c of curvature 30 of the sample surface 10 and strikes the sample surface 10.

The present invention further provides a surface evaluation method, wherein the divided evaluation signal 120 passes through a light collector 7 having a focal point on the center longitudinal-direction axis 10a of the sample 10 and strikes the sample surface 32.

The present invention further provides a surface evaluation method, wherein an incidence onto a reference surface of a reference signal obtained by dividing an evaluation signal from a light source is in a normal direction with respect to the reference surface.

The present invention further provides a surface evaluation method, wherein the reference surface has a shape of a side surface of a cylinder.

The present invention further provides a surface evaluation method, wherein the reference signal 110 is incident on a light path such that light is collected on the center longitudinal-direction axis 21a of the reference 21, which is of cylindrical shape.

The present invention further provides a surface evaluation method, wherein the reference signal 110 is incident on a light path such that light is collected onto the center 21b of curvature 30 of the reference surface 11, which is of cylindrical shape.

The present invention further provides a surface evaluation method, wherein the reference signal 110 passes through a light collector 7 having a focal point on the center longitudinal-direction axis 21a of the reference 21 and strikes the reference surface 11.

The present invention further provides surface evaluation method, wherein the reference signal 110 passes through a light collector 7 having a focal point on the center 21b of curvature 30 of the reference surface 11 and strikes the reference surface 11.

The present invention further provides a surface evaluation method for evaluating a surface 32 of a sample 10 having curvature 30, wherein an evaluation signal 100 from a light source 1 is divided, so as to obtain a divided evaluation signal 120 and a reference signal 110, an incidence of the divided evaluation signal 120 and the reference signal 110 to the sample surface 32 and the reference surface 11 being in normal directions with respect to the sample surface 32 and the reference surface 11, respectively.

The present invention further provides a surface evaluation system having a light source that is caused to generate an evaluation signal, an evaluation signal dividing means that divides an evaluation signal into a divided evaluation signal and a reference signal, and shines these signals onto a sample surface and a reference surface, respectively, and a laser interference means for causing interference between a reflected divided evaluation signal and a reflected reference signal reflected on the sample surface and the reference surface, respectively, wherein the laser interference means includes a light collector having a focal point on the center longitudinal-direction axis of the sample.

The present invention further provides a surface evaluation system having a light source that is caused to generate an evaluation signal, an evaluation signal dividing means that divides the evaluation signal into a divided evaluation signal and a reference signal, and shines these signals onto a sample surface and a reference surface, respectively, and a laser interference means for causing interference between a reflected divided evaluation signal and a reflected reference signal reflected on the sample surface and the reference surface, respectively, wherein the laser interference means includes a light collector having a focal point on the center longitudinal-direction axis of the reference.

The present invention further provides a surface evaluation system having a light source that is caused to generate an evaluation signal, an evaluation signal dividing means that divides the evaluation signal into a divided evaluation signal and a reference signal, and shines these signals onto a sample surface and a reference surface, respectively, and a laser interference means for causing interference between a reflected divided evaluation signal and a reflected reference signal reflected on the sample surface and the reference surface, respectively, wherein the laser interference means includes a light collector having a focal point at the center of curvature of the sample surface.

The present invention further provides a surface evaluation system having a light source that is caused to generate an evaluation signal, an evaluation signal dividing means that divides the evaluation signal into a divided evaluation signal and a reference signal, and shines these signals onto a sample surface and a reference surface, respectively, and a laser interference means for causing interference between a reflected divided evaluation signal and a reflected reference signal reflected on the sample surface and the reference surface, respectively, wherein the laser interference means includes a light collector having a focal point at the center of curvature of the reference surface.

The present invention further provides a surface evaluation system having a light source that is caused to generate an evaluation signal, an evaluation signal dividing means that divides the evaluation signal into a divided evaluation signal and a reference signal, and shines these signals onto a sample surface and a reference surface, respectively, and a laser interference means for causing interference between a reflected divided evaluation signal and a reflected reference signal reflected on the sample surface and the reference surface, respectively, wherein the laser interference means includes a light collector having a focal point on the center longitudinal-direction axis of the sample and the reference, respectively.

The present invention further provides a surface evaluation system having a light source that is caused to generate an evaluation signal, an evaluation signal dividing means that divides the evaluation signal into a divided evaluation signal and a reference signal, and shines these signals onto a sample surface and a reference surface, respectively, and a laser interference means for causing interference between a reflected divided evaluation signal and a reflected reference signal reflected on the sample surface and the reference surface, respectively, wherein the laser interference means includes light collectors having a focal point at the center of curvature of the sample surface and the reference surface, respectively.

While in this embodiment the sample was silicon and the sample surface was the side surface of a cylinder, it should be understood that the present invention is not restricted with regard to the material or shape. The light-collecting lens 7 is not restricted to the shape of the side of a cylinder, and it is self-evident that any light-collecting lens that enables light to strike the sample surface and the reference surface in the normal direction can be used.

According to the present invention, by shining an evaluation signal and a reference signal onto the center of curvature of the surfaces that are to reflect these signals, the reflected signals fold back on the path of the incidence signal, enabling maximization of the reflection cross-sectional area under these conditions, and enabling expansion of the reflection region, that is, expansion of the evaluation region.

Third Embodiment

The third embodiment of a surface evaluation system according to the present invention is described below. A feature of the third embodiment of the present invention is that the wave of the fundamental wavelength of the evaluation signal is made sufficiently stronger than the unnecessary radiation signal (no shown in the drawings) from the sample and the unnecessary reflection signal (no shown in the drawings) from the sample surface, so that the influence on the reflected divided evaluation signal 121 by the unnecessary radiation signal and the reflection signal is reduced, thereby enabling highly precise surface evaluation.

Additionally, by using an evaluation signal 100 having a wavelength that is shorter than that of the radiation signal from the sample, it is possible to further reduce the influence of the radiation signal and the reflection signal on reflected divided evaluation signal 121.

Figure 2:
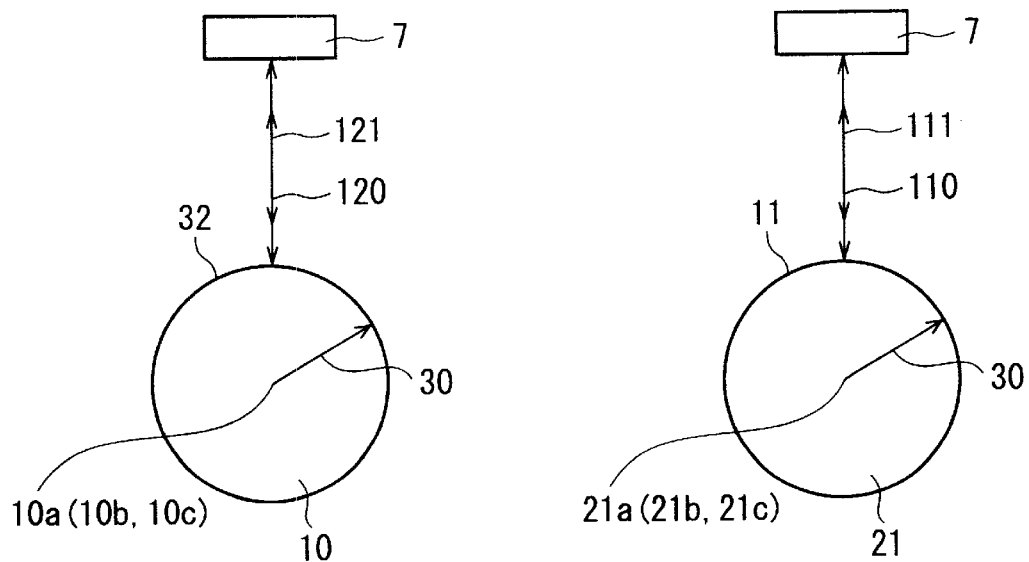
FIG. 2(a) is a drawing showing the relation between an incidence direction of a divided evaluation signal and a sample surface, and the relation between an incidence direction of a reference signal and a reference surface of the present invention.
FIG. 2(b) is perspective views showing a sample and a reference of the present invention.
Figure 2:
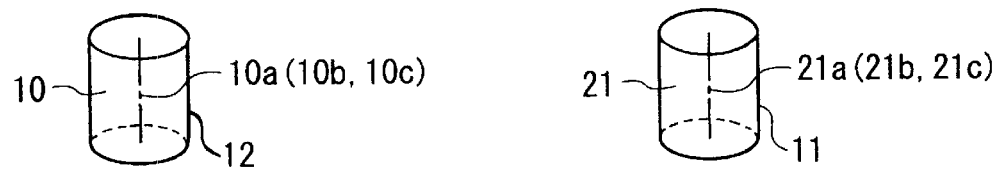

Referring to FIG. 1 of the accompanying drawings, the configuration of a surface evaluation system according to the present invention is follows. Specifically, this surface evaluation system has a laser light source 1 that generates an evaluation signal 100, a half-wave plate 2, a neutral density filter 4, a diffusion plate 5, a polarizing beam splitter 6, an image furnace 9, silicon melt 10 that is a sample molten fluid in the image furnace 9, a plane mirror having a reference surface 11, a light-collecting lens 7, a quarter-wave plate 8, a filter 12, a video camera 13, and a computer 14 for analyzing data.

The laser light source 1 is a signal source that generates an evaluation signal 100 having linear polarization of a wavelength such that a wavelength of the reflected divided evaluation signal 121 reflected on the sample 10, that is, reflected on the silicon melt 10 is different from a wavelength of the unnecessary radiation signal from the sample surface 10. This would be, for example, a signal source 1 that generates an evaluation signal 100 of a wavelength that is shorter than the wavelengths of the unnecessary radiation signal from the sample and the unnecessary reflection signal from the sample surface 32. The half-wave plate 2 adjusts the polarization direction.

The polarizing beam splitter 6 has the function of splitting the laser light that is incident via the half-wave plate 2, the neutral density filter 4, and the diffusion plate 5, this being the evaluation signal 100. The evaluation signal 100 is split by the polarizing beam splitter 6 into a divided evaluation signal 120 and a reference signal 110. The divided evaluation signal 120 strikes the surface 32 of the silicon melt 10, and the reference signal 110 strikes the reference surface 11 of the plane mirror 21.

After the divided evaluation signal and the reference signal are shone onto the silicon melt 10 surface 32 and the reference surface 11, respectively, the quarter-wave plate 8 readjusts the polarization direction, so that the divided reflected evaluation signal 121 obtained from the sample surface 32 and the reflected reference signal 111 obtained from the reference surface 11 can interfere, and obtain the laser interference signal 130. The laser interference signal 130 from the quarter-wave plate 8 is collected by the light-collecting lens 7 and caused to strike the filter 12.

The filter 12 removes long-wavelength light radiated from the surface 32 of the silicon melt 10 from the laser interference signal 130. The laser interference signal having passed through the filter 12 is captured by the video camera 13, and then analyzed by the computer.

Example 3

In this example, surface vibration of silicon melt is measured without contact therewith, using phase-shift interferometry, that is high-resolution optical interferometry. The purpose of this measurement is to measure the vibration of the surface of the silicon melt with high temporal and spatial resolution, and to examine how that vibration varies with a change in Marangoni number, and to predict the change of the shape of the silicon melt from the partial shape of the surface of the silicon melt.

An apparatus and a method for performing the above-noted measurement are described below. In this example, Michelson interferometry is used to convert Moire interference fringes to a high-resolution phase diagram. To prevent mixing of unnecessary radiation signal radiated from the silicon melt 10, the laser light source 1 used is an argon excimer laser with a wavelength of 488 nm. The light radiated from the image furnace 9 is cut by the filter 12. Because of the large curvature of the silicon melt 10, the contact range of the laser light is circle having a radius of approximately 0.5 mm. The spatial resolution of this apparatus is approximately 1 nm, and the temporal resolution is $\frac{1}{30}$ s.

The silicon melt 10 is a fluid column having a diameter of 10 mm and a height of approximately 10 mm, supported at the top and bottom by carbon, and heating by rotating elliptical image furnace 9 so as to melt. Under these conditions, the inside of the furnace 9 is filled with argon gas, so that the silicon melt 10 does oxidize.

The temperature difference between the top and bottom surfaces is approximately 150K, and the upper surface temperature was increased so as to avoid convection buoyancy. The Marangoni number is estimated to be approximately 14600. A solid silicon cylinder with a polished surface is used as the plane mirror (reference). The diameter of the cylinder was 10 mm, the same as the silicon melt. Michelson interferometry was used, and the interference fringes obtained were converted to a 512-level phase diagram using an electronic Moire phase-shift method.

By using the above-noted optical arrangement, the interference signal that exhibits time variations due to the Marangoni vibration and characteristic vibrations at the surface of the silicon melt 10 were obtained as a two-dimensional plot. A computer 14 was used to multiply this by the generated fringe image so as to obtain a phase distribution plot having dimensions 0.5 mm×1.0 mm. By performing a Fourier transform on this, it was possible to obtain the vibration frequencies at the surface of the silicon melt 10.

When using a helium-neon laser with a wavelength of 663 nm as the laser light source, because the silicon melt surface radiates the self-excitations (radiation) from the silicon cylinder surface containing the same wavelength and the silicon melt surface reflects the lamp filament image, the intensity of the interference signal becomes relatively weak, making it impossible to obtain an interference plot. For this reason, it was not possible to perform analysis of the vibration frequency.

In this example of the present invention, although an argon ion laser is used as the light source, the technology of the present invention can make use of, for example, a nitrogen laser, an ArF excimer laser or other short-wavelength laser, the type of laser being determined in relationship to the sample material, and does not place a restriction on material.

As described above, in a surface evaluation method in which evaluation light from a light source is split to obtain a divided evaluation signal and a reference signal, the divided evaluation signal and the reference signal being shone, respectively, onto a sample surface and a reference surface, after which a reflected divided evaluation signal and a reflected reference signal, which are reflected from the sample surface and the reference surface, respectively, are caused to interfere for analysis of the sample surface, wherein a frequency of the evaluation signal is selected such that a frequency of the reflected divided evaluation signal is different from that of a radiation signal emanated from the sample surface.

The present invention also provides a surface evaluation method in which, after obtaining an interference signal by causing interference between the reflected divided evaluation signal and the reflected reference signal, a signal component having a wavelength that is longer than that of radiation signal is removed from the interference signal.

The present invention also provides a surface evaluation method in which the wavelength of the evaluation signal is shorter than the wavelength of the radiation signal.

The present invention also provides a surface evaluation method in which the evaluation signal is obtained from an argon ion laser.

The present invention also provides a surface evaluation method in which the evaluation signal is obtained from a short-wavelength laser.

The present invention also provides a surface evaluation method in which the short-wavelength laser is a nitrogen laser.

The present invention also provides a surface evaluation method in which the short-wavelength laser is an ArF excimer laser.

The present invention also provides a surface evaluation system having a light source that is caused to generated an evaluation signal, an evaluation signal dividing means for dividing the evaluation signal into a divided evaluation signal and a reference signal and shining these signals onto a sample surface and a reference surface, respectively, and a laser interference means for obtaining a laser interference signal by causing interference between a reflected divided evaluation signal and a reflected reference signal that are reflected from the sample surface and the reference surface, respectively, wherein a frequency of the evaluation signal is selected such that a frequency of the reflected divided evaluation signal is different from that of a radiation signal emanated from the sample surface.

Additionally, the present invention provides a surface evaluation system having a filter that removes from the laser interference signal a signal component having a wavelength longer than the wavelength of the radiation signal.

Additionally, the present invention provides a surface evaluation system wherein the wavelength of the evaluation signal generated by the light source is shorter than the wavelength of the radiation signal.

Additionally, the present invention provides a surface evaluation system wherein the evaluation signal is a signal obtained from an argon ion laser.

Additionally, the present invention provides a surface evaluation system wherein the evaluation signal is a signal obtained from a short-wavelength laser.

Additionally, the present invention provides a surface evaluation system wherein the short-wavelength laser is an ArF excimer laser.

By using the present invention, it is possible to reduce the influence of the unnecessary radiation signal on the evaluation signal, thereby enabling highly precise surface evaluation.

What is claimed is:

1. A surface evaluation method comprising:

splitting an evaluation signal from a light source to obtain a divided evaluation signal and a reference signal;

shining said divided evaluation signal onto a sample surface;

shining said reference signal onto a reference surface;

reflecting said divided evaluation signal from said sample surface;

reflecting said reference signal from said reference surface; and generating an interference signal by said reflected divided evaluation signal interfering with said reflected reference signal generating an interference signal, wherein said sample surface comprises a surface of molten silicon emanating a thermal radiation signal, and wherein a frequency of said evaluation signal is different from a frequency of said thermal radiation signal from said sample surface.

2. The method of claim 1, further comprising removing a signal component having a wavelength longer than said evaluation signal from said interference signal.

3. The surface evaluation method of claim 1, wherein a wavelength of said evaluation signal is shorter than that of said radiation signal.

4. The surface evaluation method of claim 1, wherein said light source comprises an argon ion laser.

5. The surface evaluation method of claim 1, wherein said light source comprises a short-wavelength laser.

6. The surface evaluation method of claim 5, wherein said short-wavelength laser comprises a nitrogen laser.

7. The surface evaluation method of claim 5, wherein said short-wavelength laser comprises an ArF excimer laser.

8. A surface evaluation system comprising;
a light source that generates an evaluation signal;
an evaluation signal divider that divides said evaluation signal into a divided evaluation signal and a reference signal and that shines said signals onto a sample surface and a reference surface, respectively; and
a laser interference device that causes interference between a reflected divided evaluation signal and a reflected reference signal that are reflected from said sample surface and said reference surface, respectively, wherein said sample surface comprises a surface of molten silicon emanating a thermal radiation signal, and wherein a frequency of said evaluation signal is different from that of said thermal radiation signal emanated from said sample surface.

9. The surface evaluation system of claim 8, further comprising a filter that removes, from said laser interference signal, a signal component having a wavelength longer than a wavelength of said evaluation signal.

10. A surface evaluation system according to claim 8, wherein a wavelength of said evaluation signal generated by said light source is shorter than a wavelength of said radiation signal.

11. The surface evaluation system of claim 8, wherein said light source comprises an argon ion laser.

12. The surface evaluation system of claim 8, wherein said light source comprises a short-wavelength laser.

13. The surface evaluation system of claim 12, wherein said short-wavelength laser comprises a nitrogen laser.

14. The surface evaluation system of claim 12, wherein said short-wavelength laser comprises an ArF excimer laser.

15. A method for providing an evaluation signal, comprising:
dividing an evaluation signal to obtain a divided evaluation signal; and
shining said divided evaluation signal onto a sample surface at a normal direction, wherein said sample surface comprises a surface of molten silicon emanating a thermal radiation signal, and wherein a frequency of said evaluation signal is different from that of said thermal radiation signal from said sample surface.

16. The method of claim 15, wherein said sample surface has a shape of a side surface of a cylinder.

17. The surface evaluation method of claim 15, wherein said divided evaluation signal passes through a light collector having a focal point at a center of curvature of said sample surface and strikes said sample surface.

18. The surface evaluation method of claim 15, wherein said divided evaluation signal passes through a light collector having a focal point on a center axis of said sample and strikes said sample surface.

19. A method for providing an evaluation signal comprising dividing an evaluation signal to obtain a reference signal which is incident onto a reference surface at a normal direction, wherein said sample surface comprises a surface of molten silicon emanating a thermal radiation signal, and wherein a frequency of said evaluation signal is different from that of said thermal radiation signal from said sample surface.

20. A method for providing an evaluation signal comprising:
dividing an evaluation signal from a light source to obtain a divided evaluation signal and a reference signal;
shining said divided evaluation signal onto a sample surface at a normal direction; and
shining said reference signal onto a sample surface at a normal direction, wherein said sample surface comprises a surface of molten silicon emanating a thermal radiation signal, and wherein a frequency of said evaluation signal is different from that of said thermal radiation signal from said sample surface.

21. The surface evaluation method of claim 20, wherein said reference surface has a shape of a side surface of a cylinder.

22. The surface evaluation method of claim 20, wherein said reference signal is incident on a light path such that light is collected on a center axis of said reference, which is of cylindrical shape.

23. The surface evaluation method of claim 20, wherein said reference signal is incident on a light path such that light is collected on a center of curvature of said reference surface, which is of cylindrical shape.

24. The surface evaluation method of claim 20, wherein said reference signal passes through a light collector having a focal point on a center axis of said reference and strikes said reference surface.

25. The surface evaluation method of claim 20, wherein said reference signal passes through a light collector having a focal point on a center of curvature of said reference surface and strikes said reference surface.

26. A surface evaluation method comprising:
splitting an evaluation light to obtain a divided evaluation signal and a reference signal;
shining said divided evaluation signal onto a sample surface;
shining said reference signal onto a reference surface;
reflecting said divided evaluation signal from said sample surface; and
reflecting said reference signal from said reference surface, such that said reflected divided evaluation signal interferes with said reflected reference signal, wherein said sample surface comprises a surface of molten silicon emanating a thermal radiation signal, and wherein said reference surface comprises silicon and wherein a frequency of said evaluation signal is different from that of said thermal radiation signal from said sample surface.

27. A surface evaluation system comprising:

a light source that generates an evaluation signal;

an evaluation signal divider that divides said evaluation signal into a divided evaluation signal and a reference signal, and that shines said signals onto a sample surface and a reference surface, respectively; and a laser interference device that causes interference between a reflected divided evaluation signal and a reflected reference signal reflected from said sample surface and said reference surface, respectively;

wherein said laser interference device includes a light collector having a focal point on a center axis of said sample, wherein said sample surface comprises a surface of molten silicon emanating a thermal radiation signal, and wherein a frequency of said evaluation signal is different from that of said thermal radiation signal from said sample surface.

28. A surface evaluation system comprising:

a light source that generates an evaluation signal;

an evaluation signal divider that divides said evaluation signal into a divided evaluation signal and a reference signal, and that shines said signals onto a sample surface and a reference surface, respectively; and a laser interference device that causes interference between a reflected divided evaluation signal and a reflected reference signal reflected from said sample surface and said reference surface, respectively;

wherein said laser interference device includes a light collector having a focal point on a center axis of said reference, wherein said sample surface comprises a surface of molten silicon emanating a thermal radiation signal, and wherein a frequency of said evaluation signal is different from that of said thermal radiation signal from said sample surface.

29. A surface evaluation system comprising:

a light source that generates an evaluation signal;

an evaluation signal divider that divides said evaluation signal into a divided evaluation signal and a reference signal, and that shines said signals onto a sample surface and a reference surface, respectively; and a laser interference device that causes interference between a reflected divided evaluation signal and a reflected reference signal reflected from said sample surface and said reference surface, respectively;

wherein said laser interference device includes a light collector having a focal point on a center of curvature of said sample surface, wherein said sample surface comprises a surface of molten silicon emanating a thermal radiation signal, and wherein a frequency of said evaluation signal is different from that of said thermal radiation signal from said sample surface.

30. A surface evaluation system comprising:

a light source that generates an evaluation signal;

an evaluation signal divider that divides said evaluation signal into a divided evaluation signal and a reference signal, and that shines said signals onto a sample surface and a reference surface, respectively; and a laser interference device that causes interference between a reflected divided evaluation signal and a reflected reference signal reflected from said sample surface and said reference surface, respectively;

wherein said laser interference device includes a light collector having a focal point on a center of curvature of said reference surface, wherein said sample surface comprises a surface of molten silicon emanating a thermal radiation signal, and wherein a frequency of said evaluation signal is different from that of said thermal radiation signal from said sample surface.

31. A surface evaluation system comprising:

a light source that generates an evaluation signal;

an evaluation signal divider that divides said evaluation signal into a divided evaluation signal and a reference signal, and that shines said signals onto a sample surface and a reference surface, respectively; and a laser interference device that causes interference between a reflected divided evaluation signal and a reflected reference signal reflected from said sample surface and said reference surface, respectively;

wherein said laser interference device includes light collectors having a focal point on a center axis of said sample and said reference, respectively, wherein said sample surface comprises a surface of molten silicon emanating a thermal radiation signal, and wherein a frequency of said evaluation signal is different from that of said thermal radiation signal from said sample surface.

32. A surface evaluation system comprising:

a light source that generates an evaluation signal;

an evaluation signal divider that divides said evaluation signal into a divided evaluation signal and a reference signal, and that shines said signals onto a sample surface and a reference surface, respectively; and a laser interference device that causes interference between a reflected divided evaluation signal and a reflected reference signal reflected from said sample surface and said reference surface, respectively;

wherein said laser interference device includes light collectors having a focal point on a center of curvature of said sample and said reference, respectively, wherein said sample surface comprises a surface of molten silicon emanating a thermal radiation signal, and wherein a frequency of said evaluation signal is different from that of said thermal radiation signal from said sample surface.

33. A surface evaluation method comprising:

splitting an evaluation light to obtain a divided evaluation signal and a reference signal;

shining said divided evaluation signal onto a sample surface;

shining said reference signal onto a reference surface;

reflecting said divided evaluation signal from said sample surface; and reflecting said reference signal from said reference surface, such that said reflected divided evaluation signal interferes with said reflected reference signal, wherein said reference surface has the same curvature as the sample surface, wherein said sample surface comprises a surface of molten silicon emanating a thermal radiation signal, and wherein a frequency of said evaluation signal is different from that of said thermal radiation signal from said sample surface.

34. The surface evaluation method of claim 33, wherein said sample surface has a shape of a side surface of a cylinder, and said reference surface has a shape of a side surface of a cylinder.

35. The surface evaluation method of claim 33, wherein said reference signal is reflected at a reference surface that comprises a polished mirror surface.

36. A surface evaluation method according to claim 33, wherein said reference signal is reflected at a reference surface that is made of silicon.

37. A surface evaluation system comprising:

a light source that generates an evaluation signal;

an evaluation signal divider that divides said evaluation signal into a divided evaluation signal and a reference signal, and that shines said signals onto a sample surface and a reference surface, respectively; and a laser interference device that causes interference between a reflected divided evaluation signal and a reflected reference signal reflected from said sample surface and said reference surface, respectively;

wherein said reference surface comprises the same material as said sample, wherein said sample surface comprises a surface of molten silicon emanating a thermal radiation signal, and wherein a frequency of said evaluation signal is different from that of said thermal radiation signal from said sample surface.

38. A surface evaluation system according to claim 37, wherein said reference surface has the same curvature as said sample surface.

39. The surface evaluation system of claim 37, wherein said reference surface comprises silicon.

40. A surface evaluation system according to claim 37, wherein said reference surface has a shape of a side surface of a cylinder.

41. A surface evaluation system according to claim 37, wherein said reference surface is a polished mirror surface.

* * * * *

UNITED STATES PATENT AND TRADEMARK OFFICE
CERTIFICATE OF CORRECTION

PATENT NO.   : 6,580,514 B1
DATED        : June 17, 2003
INVENTOR(S)  : Kazuo Onuma, Shin Nakamura and Taketoshi Hibiya It is certified that error appears in the above-identified patent and that said Letters Patent is hereby corrected as shown below:

Title page,
Item [73], Assignees, should read:
-- NEC Corporation, Minato-ku, Tokyo (JP); Secretary of Agency of Industrial Science and Technology, Chiyoda-ku, Tokyo (JP); Kazuo Onuma, Tsukuba-shi, Ibaraki (JP) --

Signed and Sealed this

Twenty-fifth Day of May, 2004

JON W. DUDAS
*Acting Director of the United States Patent and Trademark Office*